United States Patent
Oroskar et al.

(10) Patent No.: US 9,473,973 B1
(45) Date of Patent: Oct. 18, 2016

(54) REDUCING TRANSMISSION RATES IN DATA SLOTS SUBJECT TO BUNDLED ACKNOWLEDGMENTS

(71) Applicant: Sprint Spectrum L.P., Overland Park, KS (US)

(72) Inventors: Siddharth S. Oroskar, Overland Park, KS (US); Maulik K. Shah, Austin, TX (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 123 days.

(21) Appl. No.: 14/281,412

(22) Filed: May 19, 2014

(51) Int. Cl.
*H04W 28/02* (2009.01)
*H04W 72/12* (2009.01)
*H04L 1/18* (2006.01)

(52) U.S. Cl.
CPC ........ *H04W 28/0236* (2013.01); *H04L 1/1812* (2013.01); *H04W 72/12* (2013.01)

(58) Field of Classification Search
CPC ................................. H04W 28/0236
See application file for complete search history.

(56) References Cited

U.S. PATENT DOCUMENTS

| | | | |
|---|---|---|---|
| 6,308,294 B1 | 10/2001 | Ghosh et al. | |
| 6,631,127 B1 | 10/2003 | Ahmed et al. | |
| 6,697,987 B2 | 2/2004 | Lee et al. | |
| 6,925,132 B2 | 8/2005 | Song et al. | |
| 7,002,993 B1 | 2/2006 | Mohaban et al. | |
| 7,136,929 B2 | 11/2006 | Koprivica | |
| 7,206,280 B1 | 4/2007 | Khan et al. | |
| 7,388,919 B2 | 6/2008 | Varma et al. | |
| 7,447,968 B2 | 11/2008 | Ha et al. | |
| 7,715,347 B2 | 5/2010 | Yoon et al. | |
| 7,978,626 B1 | 7/2011 | Khanka et al. | |
| 2004/0141525 A1 | 7/2004 | Bhushan et al. | |
| 2004/0179475 A1 | 9/2004 | Hwang et al. | |
| 2006/0013216 A1 | 1/2006 | Rajkotia et al. | |
| 2006/0109810 A1 | 5/2006 | Au et al. | |
| 2007/0070952 A1 | 3/2007 | Yoon et al. | |
| 2007/0091816 A1 | 4/2007 | Lee et al. | |
| 2007/0110095 A1 | 5/2007 | Attar et al. | |
| 2007/0168822 A1 | 7/2007 | Vitebsky et al. | |
| 2007/0214400 A1 | 9/2007 | Smith et al. | |
| 2007/0300120 A1 | 12/2007 | Kim et al. | |
| 2008/0130643 A1 | 6/2008 | Jain et al. | |

(Continued)

FOREIGN PATENT DOCUMENTS

WO      2007/059523      5/2007

OTHER PUBLICATIONS

IEEE 802.16 Broadband Wireless Access Working Group <http://ieee802.org/16>, Aggregated H-ARQ, Lim Geunhwi, et al., Nov. 4, 2004.

*Primary Examiner* — Jason Mattis

(57) ABSTRACT

It may be determined that a HARQ transmission schedule from a RAN to a WCD includes HARQ acknowledgment bundling. An indication of signal quality as measured by the WCD may be received by the RAN. The indicated signal quality may be associated with a first transmission rate. The RAN may determine a first set of one or more data slots of the HARQ transmission schedule for which the WCD bundles HARQ acknowledgments. In response to this determination, one or more HARQ subpackets may be transmitted to the WCD in the first set of one or more data slots. The one or more HARQ subpackets may be transmitted at a second transmission rate that is less than the first transmission rate.

17 Claims, 5 Drawing Sheets

(56) References Cited

U.S. PATENT DOCUMENTS

| | | |
|---|---|---|
| 2008/0168321 A1 | 7/2008 | Lim et al. |
| 2008/0194284 A1 | 8/2008 | Choi et al. |
| 2009/0016265 A1 | 1/2009 | Katayama et al. |
| 2009/0129276 A1 | 5/2009 | Dendy |
| 2009/0319854 A1 | 12/2009 | Qian et al. |
| 2009/0327443 A1 | 12/2009 | Pawar et al. |
| 2010/0091735 A1 | 4/2010 | Kim et al. |
| 2010/0135156 A1 | 6/2010 | Sarkar |
| 2011/0075611 A1* | 3/2011 | Choi .................... H04L 1/1819 370/329 |
| 2012/0039227 A1 | 2/2012 | Chen et al. |
| 2012/0213192 A1* | 8/2012 | Kiyoshima ........... H04L 1/0009 370/330 |
| 2014/0126551 A1* | 5/2014 | Nammi ................ H04L 1/0025 370/336 |
| 2014/0198677 A1* | 7/2014 | Xu ....................... H04L 1/0026 370/252 |
| 2014/0301280 A1* | 10/2014 | Che ...................... H04L 5/0055 370/329 |
| 2014/0307695 A1* | 10/2014 | Yang ....................... H04L 1/18 370/329 |
| 2015/0237644 A1* | 8/2015 | Golitschek Edler Von Elbwart ............... H04W 72/12 370/329 |

\* cited by examiner

REDUCING TRANSMISSION RATES IN DATA SLOTS SUBJECT TO BUNDLED ACKNOWLEDGMENTS

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may derive one or more subpackets from a full packet to be transmitted to a WCD. The RAN may transmit at least one of these subpackets to the particular WCD. The particular WCD may transmit an acknowledgment (positive or negative) in response to each subpacket that it receives.

OVERVIEW

Communication networks in general, and wireless networks in particular, are subject to impairments that can lead to packet corruption and packet loss. For instance, a wireless signal can suffer from various types of attenuation, reflections, and/or interference. In order to address these problems, and to reduce the effective packet loss rate of a channel, forward error correction (FEC) schemes may be used.

In general, FEC schemes permit a transmitting device, such as a base station, to transmit multiple copies of part or all of a packet to a client node, such as a WCD. Some copies may include FEC coding, for example XOR coding, Reed-Solomon coding, or turbo codes. If a WCD receives a packet with errors, it may be able to apply FEC codes contained within the packet, or contained within packets it has previously received or will subsequently receive, to properly decode the packet. In this way, packet error rates may be reduced.

One method of implementing FEC is through the use of hybrid automatic repeat request (HARQ). Using HARQ, a base station that seeks to transmit a full packet to a WCD instead transmits one or more HARQ subpackets. The HARQ subpackets may be derived from the full packet, and therefore may contain copies of part or all of the full packet. Each HARQ subpacket may also contain an extent of FEC coding. The WCD may transmit a negative acknowledgment (N-ACK) in response to each HARQ subpacket it receives until the WCD can decode the full packet from the series of subpackets. Once the WCD is able to decode the full packet, it may transmit a positive acknowledgment (P-ACK) to the base station.

The use of HARQ over frequency-division duplex (FDD) channels may result in N-ACKs and P-ACKs being transmitted at a relatively fixed time offset after their associated HARQ subpackets are transmitted. However, on time-division duplex (TDD) channels, forward-direction (downlink) traffic is separated from reverse-direction (uplink) traffic by allocation of different respective time slots in a particular frequency band. These time slots may be allocated unequally between the forward and reverse directions in order to accommodate various asymmetric traffic patterns. Thus, in some cases, there may be fewer reverse-direction time slots, in which a WCD can transmit HARQ acknowledgments to a base station, than forward-direction time slots, in which the base station can transmit HARQ subpackets to the WCD.

To accommodate this situation, HARQ acknowledgments may be bundled such that a single HARQ acknowledgment serves to acknowledge more than one HARQ subpacket. For instance, in a possible configuration, a HARQ acknowledgment may acknowledge two consecutive HARQ subpackets. If the HARQ acknowledgment is a P-ACK, then it serves to positively acknowledge both of the two associated HARQ subpackets. However, if the HARQ acknowledgment is an N-ACK, it indicates that one, the other, or both of the two associated HARQ subpackets were not properly received. After such an N-ACK is received, the base station may retransmit the two associated HARQ subpackets, or some variation thereof.

A possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of the properly received HARQ subpacket(s) is not necessary.

In order to possibly offset this disadvantage, a RAN may use a repeating HARQ transmission schedule to transmit data subpackets to a WCD and to receive HARQ acknowledgments from the WCD. In data slots of the HARQ transmission schedule that are subject to bundled HARQ acknowledgments, the RAN may transmit HARQ subpackets at a lower-than-nominal transmission rate. For instance, in these data slots, the RAN may transmit fewer modulation symbols or modulation symbols that represent fewer bits. In this way, these HARQ subpackets are more likely to be properly received by the WCD, and therefore positively acknowledged. On the other hand, in data slots of the HARQ transmission schedule that not are subject to bundled HARQ acknowledgments, the RAN may transmit HARQ subpackets at the nominal transmission rate.

Accordingly, in a first example embodiment, it may be determined that a HARQ transmission schedule from the RAN to a WCD includes HARQ acknowledgment bundling. An indication of signal quality as measured by the WCD may be received by the RAN. The indicated signal quality may be associated with a first transmission rate. The RAN may determine a first set of one or more data slots of the HARQ transmission schedule for which the WCD bundles HARQ acknowledgments. Possibly in response to determining the first set of one or more data slots of the HARQ transmission schedule for which the WCD bundles HARQ acknowledgments, one or more HARQ subpackets may be transmitted to the WCD in the first set of one or more data slots. The one or more HARQ subpackets may be transmitted at a second transmission rate that is less than the first transmission rate.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
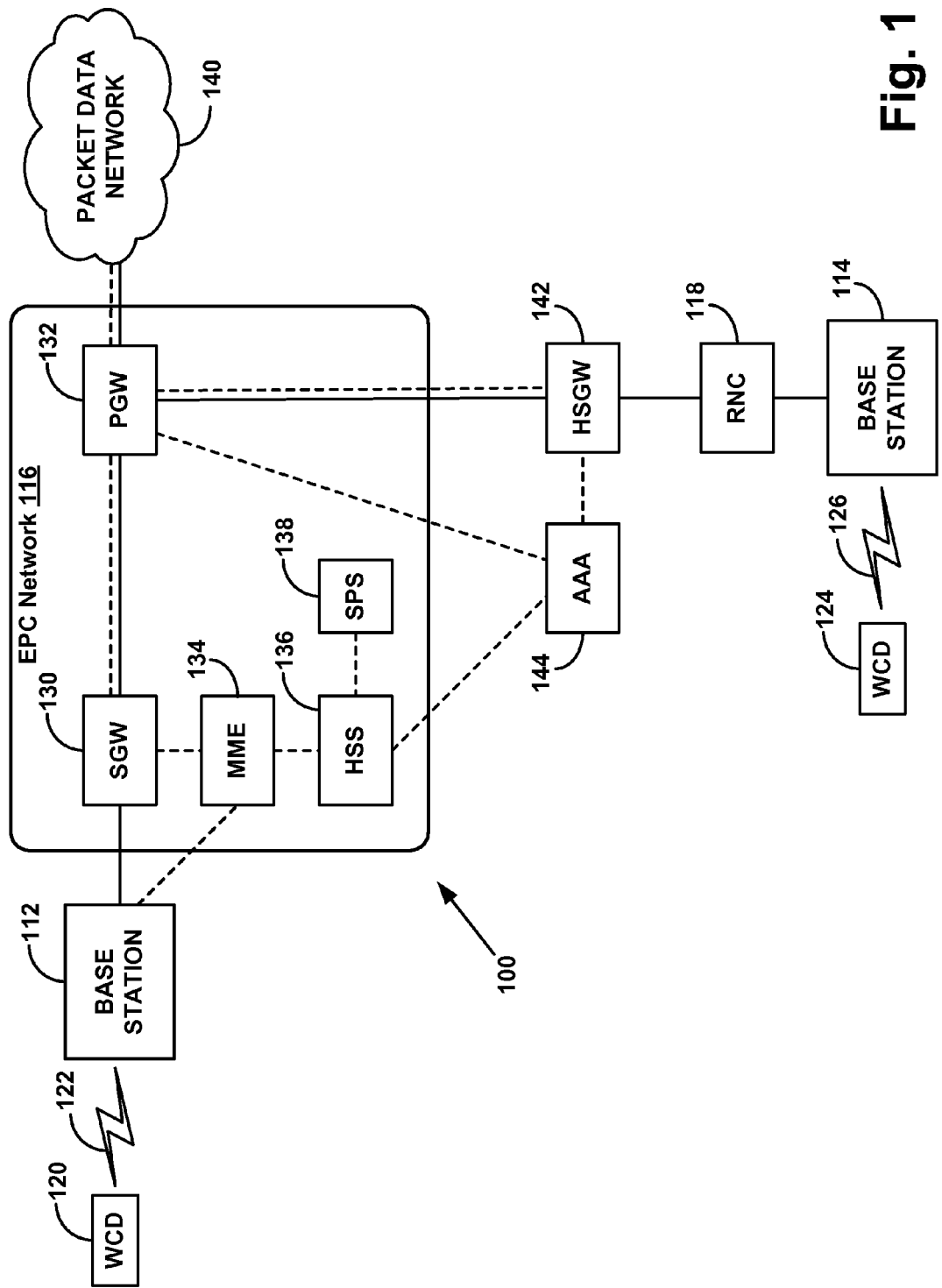
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base stations can communicate with one or more WCDs. The wireless coverage areas provided by base stations 112 and 114 could be either overlapping or non-overlapping.

A WCD may be referred to as user equipment (UE). Despite this nomenclature, a WCD need not be an end-user device, and may include various types of devices that have limited interactions with human users. For instance, WCDs 120 and 124 could be wireless telephones, wirelessly-equipped handheld, tablet, or laptop computers, or any other type of WCD.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as access subscriber profiles stored in SPS 138. For example, SPS 38 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for Web access, email, text, voice-over-IP (VoIP), video, streaming media, gaming, and/or other packet data services.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between EPC network 116 and a legacy RAN, the latter exemplified in FIG. 1 by base station 114 and RNC 118. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting.

The arrangement of wireless communication system 100 and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. Example Computing Device

Figure 2:
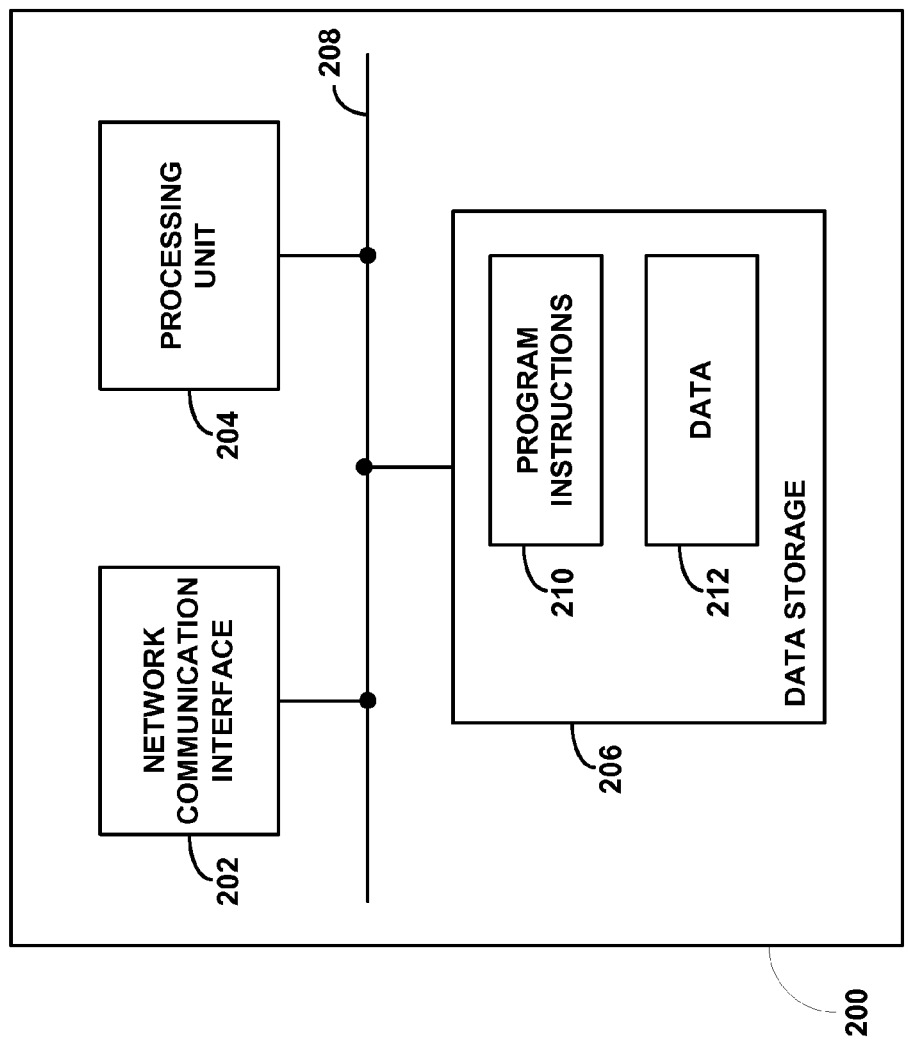
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could be a WCD or a part of the RAN. Thus, computing device 200 may represent a base station, MME, SGW, PGW, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. Example HARQ Communication

For purposes of illustration, this section describes examples of HARQ transmissions between base station 112 and WCD 120. In these examples, base station 112 transmits HARQ subpackets (possibly containing payload and/or FEC bits) to WCD 120 on a forward-direction channel, and WCD 120 transmits HARQ acknowledgments to base station 112 on a reverse direction channel.

Nonetheless, the procedures described herein may be carried out in other ways. For instance, the HARQ transmissions may take place between other types of devices, such as base station 114 and WCD 124. Alternatively, or additionally, the HARQ subpackets may be transmitted on a reverse-direction channel and the HARQ acknowledgments may be transmitted on a forward-direction channel.

Figure 3:
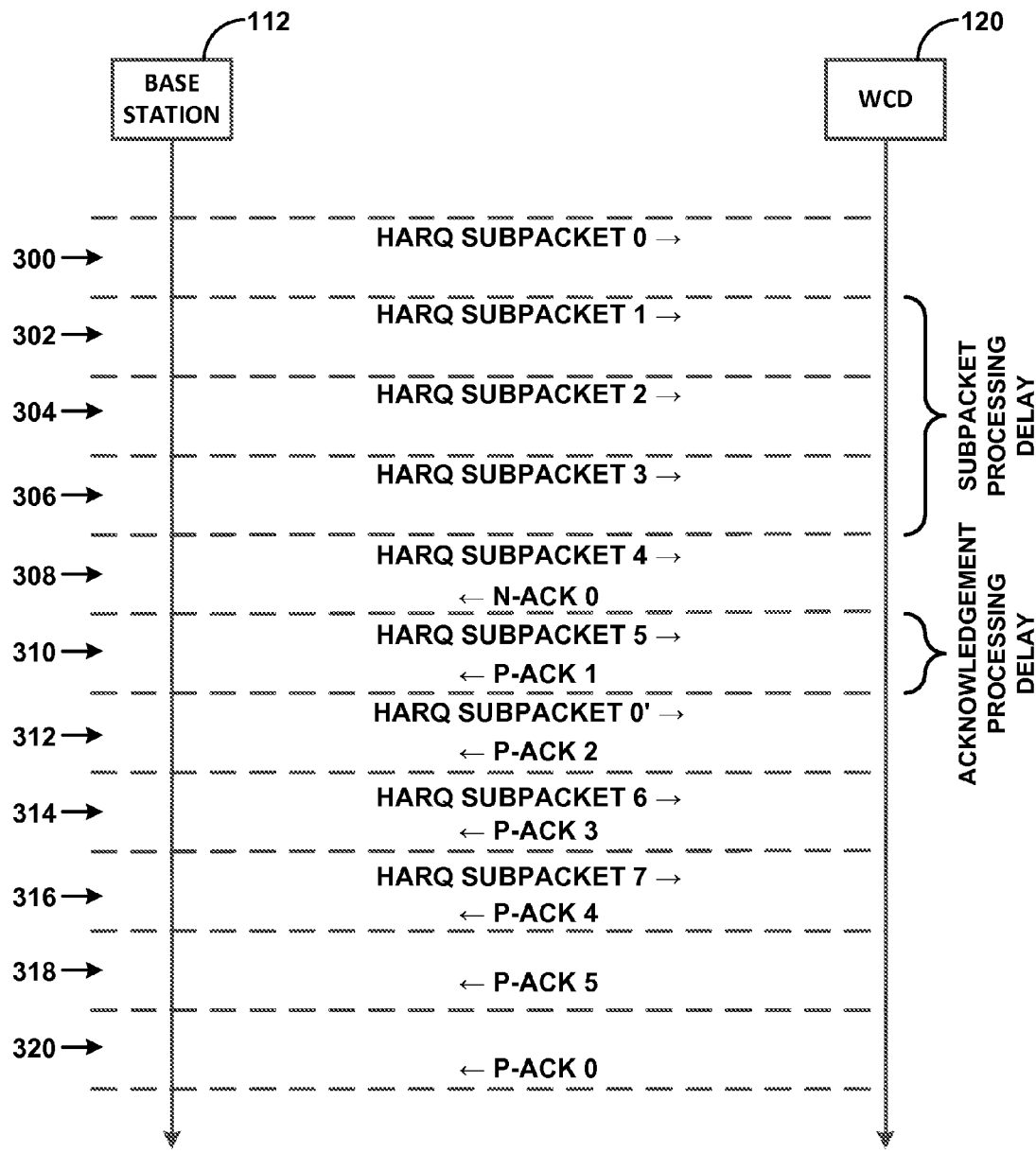
FIG. 3 illustrates unbundled HARQ transmissions, in accordance with an example embodiment.

FIG. 3 illustrates a series of HARQ transmissions between base station 112 and WCD 120 in an FDD system. Thus, in each of time slots 300-320, either or both base station 112 and WCD 120 may transmit to one another, perhaps simultaneously, on different frequencies. For purposes of simplicity, it is assumed that base station 112 has eight HARQ subpackets queued to transmit to WCD 120.

Starting in time slot 300, base station 112 begins transmitting the HARQ subpackets to WCD 120. In time slot 300, base station 112 transmits HARQ subpacket 0. In time slot 302, base station 112 transmits HARQ subpacket 1. In time slot 304, base station 112 transmits HARQ subpacket 2. In time slot 306, base station 112 transmits HARQ subpacket 3.

As an example, it is assumed that WCD 120 uses three full time slots to process each HARQ subpacket. Thus, the first opportunity that WCD 120 has to transmit a HARQ acknowledgment to base station 112 is time slot 308. In this time slot, WCD 120 N-ACKs HARQ subpacket 0, indicating that WCD 120 was unable to properly process or decode this subpacket. It is also assumed, for example, that base station 112 uses one full time slot to process each HARQ acknowledgment. Therefore, the earliest time slot in which base station 112 can respond to the N-ACK is time slot 312.

In time slot 312, base station 112 transmits HARQ subpacket 0', which may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. WCD 120 also transmits a P-ACK for HARQ subpacket 2 in this time slot.

In the interim, base station 112 transmits HARQ subpacket 4 to WCD 120 in time slot 308. Additionally, base station 112 transmits HARQ subpacket 5 to WCD 120 in time slot 310, and WCD 120 transmits a P-ACK of HARQ subpacket 1 also in time slot 310.

In time slots 314 and 316, base station 112 transmits HARQ subpackets 6 and 7, respectively, and WCD 120 transmits P-ACKs to HARQ subpackets 3 and 4, respectively. In time slots 318 and 320, base station 112 does not transmit HARQ subpackets because it has transmitted all eight that it had queued for transmission. However, should any further N-ACKs be received from WCD 120, base station 112 may retransmit the associated HARQ subpackets. Nonetheless, in time slots 318 and 320, WCD 120 transmits P-ACKs to HARQ subpackets 5 and 0, respectively.

The latter P-ACK indicates that WCD 120 properly processed and decoded HARQ subpacket 0. For instance, this P-ACK may indicate that WCD 120 successfully combined the information that it received in HARQ subpacket 0 and HARQ subpacket 0' during time slots 300 and 312. This P-ACK may also indicate that WCD 120 was able to properly process and decode the full packet from which these subpackets were derived.

FIG. 3 depicts just one possible HARQ transmission scenario. Other scenarios may exist. In some of these scenarios, there may be more or fewer N-ACKs, and the general pattern of HARQ subpacket transmission and associated HARQ acknowledgments may vary. Thus, FIG. 3 should be considered illustrative and non-limiting.

Figure 4:
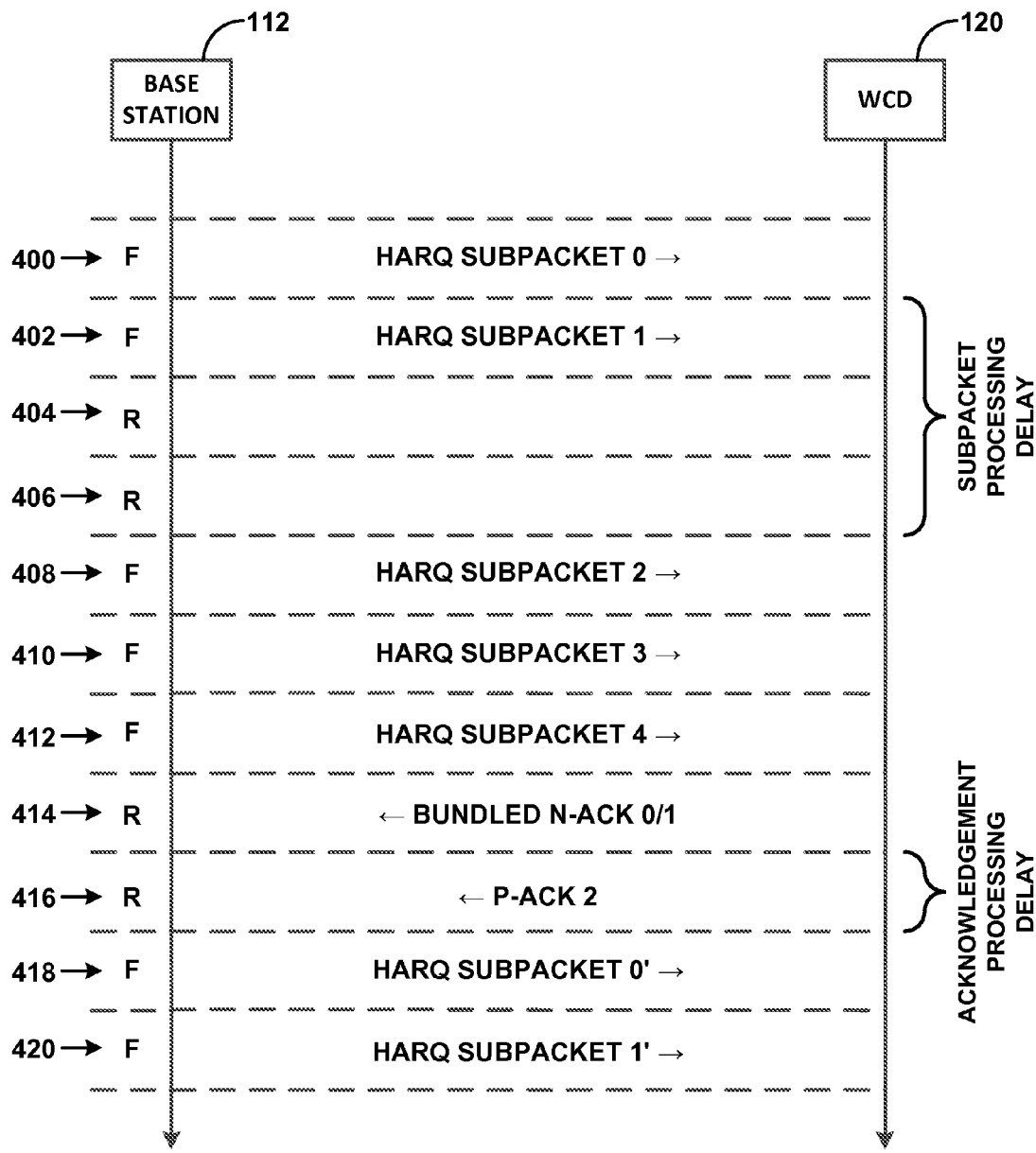
FIG. 4 illustrates bundled HARQ transmissions, in accordance with an example embodiment.

FIG. 4 illustrates a series of HARQ transmissions between base station 112 and WCD 120 in a TDD system. In a TDD system, each time slot may be used for either forward-direction transmission or reverse-direction transmission. Thus, in each of time slots 400-420, either base station 112 or WCD 120, but not both, may transmit.

In such a TDD system, the number of time slots per frame (where a frame is a repeating sequence of consecutive time slots) may be asymmetric. For instance, to accommodate client/server traffic in which client devices tend to receive more bearer data than they transmit, more TDD slots may be dedicated to supporting forward-direction traffic than reverse-direction traffic. As just one example, FIG. 4 depicts eleven time slots, seven of which are forward-direction (indicated by an "F"), and four of which are reverse-direction (indicated by an "R").

Due to such asymmetry, there may be more opportunities for HARQ transmission than HARQ acknowledgment transmission in a given frame. Thus, it may be beneficial to bundle HARQ acknowledgments. When HARQ acknowledgments are bundled, a single HARQ acknowledgment may serve to acknowledge more than one HARQ subpacket. As a possible result, more HARQ transmissions can be supported with fewer time slots.

For instance, in a possible configuration that is depicted in FIG. 4, each HARQ acknowledgment may acknowledge up to two consecutive HARQ subpackets. If the HARQ acknowledgment is a P-ACK, then it serves to positively acknowledge the associated HARQ subpackets. However, if the HARQ acknowledgment is an N-ACK for two HARQ subpackets, it indicates that one, the other, or both of these HARQ subpackets were not properly received. After such an N-ACK is received, the base station may retransmit the two associated HARQ subpackets, or some variation of these HARQ subpackets.

In FIG. 4, base station 112 transmits HARQ subpackets 0 and 1 in forward-direction time slots 400 and 402, respectively. As was the case for FIG. 3, it is assumed that WCD 120 uses three full time slots to process each HARQ subpacket and that base station 112 uses one full time slot to process each HARQ acknowledgment. Thus, in reverse-direction time slots 404 and 406, WCD 120 is not yet able to acknowledge HARQ subpackets 0 or 1.

In forward-direction time slots 408, 410, and 412, base station 112 transmits HARQ subpackets 2, 3, and 4, respectively. In reverse-direction time slot 414, WCD 120 has its first opportunity to acknowledge HARQ subpackets 0 and 1. WCD 120 transmits a bundled N-ACK for HARQ subpackets 0 and 1 in this time slot. This indicates that WCD 120 was unable to properly process or decode either HARQ subpacket 0, HARQ subpacket 1, or both.

On the other hand, in reverse-direction time slot 416, WCD 120 transmits a P-ACK for HARQ subpacket 2, indicating that WCD 120 was able to properly process and decode HARQ subpacket 2. Regardless, in forward-direction time slots 418 and 420, base station 112 transmits HARQ subpackets 0' and 1', respectively.

HARQ subpacket 0' may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. Similarly, HARQ subpacket 1' may be identical to HARQ subpacket 1. Alternatively, HARQ subpacket 1' may be different from HARQ subpacket 1', but derived from the same full packet as HARQ subpacket 1. Likewise, HARQ subpacket 1 and HARQ subpacket 1' may have similar or the same payload bits, but different FEC bits.

As demonstrated above, a possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of the properly received HARQ subpackets is not necessary.

In order to mitigate this disadvantage, the RAN may lower the transmission rate (e.g., the number of bits per data slot) it uses in data slots of the hybrid ARQ schedule that are subject to bundled HARQ acknowledgment. In this way, the likelihood that the WCD successfully receives the data in these slots is increased, which may in turn lower the likelihood that the WCD transmits a bundled N-ACK. While reducing its transmission rate for data slots subject to bundled HARQ acknowledgment, the RAN may maintain a nominal transmission rate for data slots not subject to bundled HARQ acknowledgments. Thus, the number of HARQ subpacket retransmissions due to bundled HARQ acknowledgments may be reduced.

The RAN may be aware of which slots in a frame are subject to bundled HARQ acknowledgments due to the frame's configuration. For instance, in FIG. 4, the pattern of slots 400-416 may repeat in each frame (i.e., slots 400-416 are one full frame and slots 418 and 420 are the first two slots of the next frame). Thus, the RAN may be able to conclude that HARQ acknowledgments for slots 400 and 402 will be bundled, that HARQ acknowledgments for slots 410 and 412 will be bundled, and so on. The configuration of frames between the RAN and a particular WCD may be pre-established or negotiated by these devices.

In some embodiments, the transmission rate that the RAN uses to a particular WCD may be based on a reported signal quality from that WCD. For instance, one way in which a WCD may report signal quality in an LTE system is by transmitting a channel quality indication (CQI) in the reverse direction. A CQI report may be carried by a physical uplink control channel (PUCCH) or a physical uplink shared channel (PUSCH) of the air interface.

The CQI report may contain a number between 1 and 15 that represents signal quality. The higher this value, the higher the modulation scheme coding rate that the base station may use in subsequent forward direction transmissions (e.g., 2 bits per symbol with quadrature phase-shift keying (QPSK), 4 bits per symbol with 16-point quadrature amplitude modulation (16QAM), 6 bits per symbol with 64-point quadrature amplitude modulation (64QAM), etc.). Higher CQI signal quality numbers may also indicate more symbols transmitted per data slot.

TABLE 1

CQI values and transmission rates.

| CQI Value | Modulation | Approximate Transmission Rate |
|---|---|---|
| 0 | N/A | 0 |
| 1 | QPSK | 159 kilobits per second |
| 2 | QPSK | 245 kilobits per second |
| 3 | QPSK | 395 kilobits per second |
| 4 | QPSK | 641 kilobits per second |
| 5 | QPSK | 920 kilobits per second |
| 6 | QPSK | 1.2 megabits per second |
| 7 | 16QAM | 1.5 megabits per second |
| 8 | 16QAM | 2.0 megabits per second |
| 9 | 16QAM | 2.5 megabits per second |
| 10 | 64QAM | 2.9 megabits per second |
| 11 | 64QAM | 3.5 megabits per second |
| 12 | 64QAM | 4.1 megabits per second |
| 13 | 64QAM | 4.7 megabits per second |
| 14 | 64QAM | 5.3 megabits per second |
| 15 | 64QAM | 5.8 megabits per second |

As an example, Table 1 provides a mapping between CQI values and bitrates. In Table 1, each CQI value from 1-15 is associated with a type of modulation (QPSK, 16QAM, or 64QAM). Each CQI value may also be associated with a transmission rate, from 159 kilobits per second for a CQI value of 1 to 5.8 megabits per second for a CQI value of 15. A CQI value of 0 may indicate that the WCD is receiving no signal, or negligible signal strength from the RAN.

Based on the CQI value received from a WCD, the RAN may assign a transmission rate (e.g., a type of modulation and a number of symbols per data slot) for one or more subsequent data slots with which the RAN transmits to the WCD. In general, the better the signal quality that the WCD receives from the RAN, the higher the transmission rate at which the WCD can successfully receive data from the RAN.

In situations where the RAN transmits data to a WCD in a data slot subject to HARQ bundling, the RAN may select a transmission rate for that slot which is lower than the nominal transmission rate indicated by a CQI value that the RAN received from the WCD. For example, if the RAN receives a CQI value of 5 from a particular WCD, the RAN may select a transmission rate of 159, 245, 395, or 641 kilobits per second for data slots that are subject to HARQ bundling. In some cases, the RAN may select the next lowest transmission rate (i.e., 641 kilobits per second in this example). On the other hand, for slots in the same frame that are not subject to HARQ bundling, the RAN may use a nominal transmission rate associated with the received CQI value (i.e., 920 kilobits per second in this example).

Table 1 is just one possible example of a mapping between CQI values and transmission rates. Other mappings are possible that use different CQI values and/or different transmission rates. Additionally, other types of signal quality measurement reports may be used, instead of or in addition to CQI reports, to modify transmission rates. For instance, in CDMA systems, active set measurement reports or neighbor reports may be used for this purpose.

4. Example Operations

Figure 5:
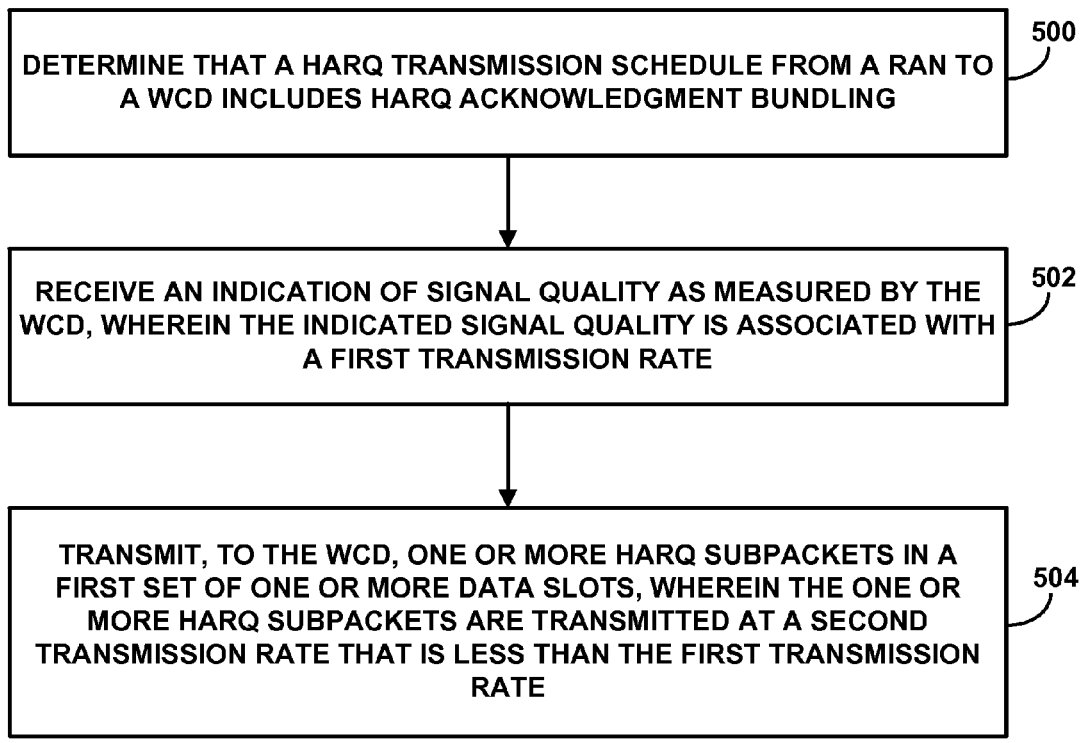
FIG. 5 is a flow chart, in accordance with an example embodiment.

FIG. 5 is a flow chart in accordance with an example embodiment. The operations illustrated by this flow chart may be carried out by a computing device, such as computing device 200. In some embodiments, computing device 200 may represent a WCD and/or a RAN device, such as a base station. The WCD and the RAN may communicate using a TDD wireless channel in which the forward-direction traffic is separated from reverse-direction traffic by allocation of different respective time slots in a particular frequency band. However, the embodiments herein may be used with other types of wireless channels as well.

At block 500 of FIG. 5, it may be determined that a HARQ transmission schedule from a RAN to a WCD includes HARQ acknowledgment bundling. Making this determination may involve also determining that, in response to a plurality of HARQ subpackets that the RAN transmits to the WCD, the RAN receives a single HARQ acknowledgment message from the WCD.

At block 502, an indication of signal quality as measured by the WCD may be received. The indicated signal quality may be associated with a first transmission rate. At block 504, possibly in response to determining a first set of one or more data slots of the HARQ transmission schedule for which the WCD bundles HARQ acknowledgments, one or more HARQ subpackets may be transmitted in the first set of one or more data slots. The data may be transmitted at a second transmission rate that is less than the first transmission rate.

Furthermore, possibly in response to determining a second set of one or more data slots of the HARQ transmission schedule for which the WCD does not bundle HARQ acknowledgments, an additional one or more HARQ subpackets may be transmitted to the WCD in the second set of one or more additional data slots. The additional one or more HARQ subpackets may be transmitted at the first transmission rate.

The RAN may have access to a table mapping signal qualities to transmission rates. The table may include an entry mapping the indicated signal quality to the first transmission rate. Transmitting the one or more HARQ subpackets in the first set of one or more data slots may involve the RAN determining the first transmission rate from the table. Alternatively or additionally, the RAN may be configured to transmit to the WCD at a particular transmission rate chosen from a discrete set of different transmission rates ordered highest to lowest. Of the different transmission rates, there may be no transmission rate with a value between the first transmission rate and the second transmission rate. Thus, the second transmission rate may be the next lowest transmission rate with respect to the first transmission rate.

Bundling HARQ acknowledgments that the WCD transmits to the RAN may involve, in response to a plurality of HARQ subpackets that the RAN transmits to the WCD, the RAN receiving a single HARQ acknowledgment message from the WCD. The single HARQ acknowledgment message may be a P-ACK message that indicates that each of the plurality of HARQ subpackets was successfully received by the WCD. Alternatively, the single HARQ acknowledgment message may be an N-ACK message that indicates that at least one of the plurality of HARQ subpackets was not successfully received by the WCD.

Additionally, the one or more HARQ subpackets may be derived from one or more full packets. Possibly based on the single HARQ acknowledgment message being an N-ACK message that indicates that at least one of the plurality of HARQ subpackets was not successfully received by the WCD, a replacement HARQ subpacket may be transmitted to the WCD. A HARQ subpacket not successfully received by the WCD, and the replacement HARQ subpacket, may be derived from the same, common full packet.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
obtaining a pre-established hybrid automatic repeat request (HARQ) transmission schedule of a fixed number of data slots for transmissions from a radio access network (RAN) to a wireless communication device (WCD), wherein the HARQ transmission schedule includes a first set of data slots subject to HARQ acknowledgment bundling and a second set of data slots not subject to HARQ acknowledgment bundling;
based on an indication of RAN transmission signal quality as measured by the WCD, determining a first transmission rate; and
based on the HARQ transmission schedule, transmitting, to the WCD, two or more HARQ subpackets in the first set of data slots subject to HARQ acknowledgment bundling and one or more HARQ subpackets in the second set of data slots not subject to HARQ acknowledgment bundling, wherein the one or more HARQ subpackets are transmitted at the first transmission rate, and wherein the two or more HARQ subpackets are transmitted at a second transmission rate that is less than the first transmission rate.

2. The method of claim 1, wherein the first set of data slots being subject to HARQ acknowledgment bundling comprises the RAN receiving a single HARQ acknowledgment message from the WCD in response to the WCD receiving HARQ subpackets transmitted in the first set of data slots.

3. The method of claim 2, wherein the single HARQ acknowledgment message is a positive acknowledgment message that indicates that each of the HARQ subpackets transmitted in the first set of data slots was successfully received by the WCD.

4. The method of claim 2, wherein the single HARQ acknowledgment message is a negative acknowledgment message that indicates that at least one of the HARQ subpackets transmitted in the first set of data slots was not successfully received by the WCD.

5. The method of claim 1, wherein the WCD and RAN communicate using a time division duplex (TDD) wireless channel in which the forward-direction traffic is separated from reverse-direction traffic by allocation of different respective time slots in a particular frequency band.

6. The method of claim 1, wherein the RAN has access to a table mapping signal qualities to transmission rates, wherein the table includes an entry mapping the indicated signal quality to the first transmission rate, and wherein the first and second transmission rates are selected from the table.

7. The method of claim 1, wherein, in the data slots of the HARQ transmission schedule, the RAN can transmit to the WCD at a particular transmission rate chosen from a discrete set of different transmission rates ordered highest to lowest, and wherein, of the different transmission rates, there is no transmission rate in the ordering between the first transmission rate and the second transmission rate.

8. An article of manufacture including a non-transitory computer-readable medium, having stored thereon program instructions that, upon execution by a radio access network (RAN) device, cause the RAN device to perform operations comprising:

obtaining a pre-established hybrid automatic repeat request (HARQ) transmission schedule of a fixed number of data slots for transmissions from the RAN to a wireless communication device (WCD), wherein the HARQ transmission schedule includes a first set of data slots subject to HARQ acknowledgment bundling and a second set of data slots not subject to HARQ acknowledgment bundling;

based on an indication of RAN transmission signal quality as measured by the WCD, determining a first transmission rate; and based on the HARQ transmission schedule, transmitting, to the WCD, two or more HARQ subpackets in the first set of data slots subject to HARQ acknowledgment bundling and one or more HARQ subpackets in the second set of data slots not subject to HARQ acknowledgment bundling, wherein the one or more HARQ subpackets are transmitted at the first transmission rate, and wherein the two or more HARQ subpackets are transmitted at a second transmission rate that is less than the first transmission rate.

9. The article of manufacture of claim 8, wherein the first set of data slots being subject to HARQ acknowledgment bundling comprises, the RAN receiving a single HARQ acknowledgment message from the WCD in response to the WCD receiving HARQ subpackets transmitted in the first set of data slots.

10. The article of manufacture of claim 9, wherein the single HARQ acknowledgment message is a positive acknowledgment message that indicates that each of the HARQ subpackets transmitted in the first set of data slots was successfully received by the WCD.

11. The article of manufacture of claim 9, wherein the single HARQ acknowledgment message is a negative acknowledgment message that indicates that at least one of the HARQ subpackets transmitted in the first set of data slots was not successfully received by the WCD.

12. The article of manufacture of claim 8, wherein the WCD and RAN communicate using a time division duplex (TDD) wireless channel in which the forward-direction traffic is separated from reverse-direction traffic by allocation of different respective time slots in a particular frequency band.

13. The article of manufacture of claim 8, wherein the RAN has access to a table mapping signal qualities to transmission rates, wherein the table includes an entry mapping the indicated signal quality to the first transmission rate, and wherein the first and second transmission rates are selected from the table.

14. The article of manufacture of claim 8, wherein, in the data slots of the hybrid ARQ transmission schedule, the RAN can transmit to the WCD at a particular transmission rate chosen from a discrete set of different transmission rates ordered highest to lowest, and wherein, of the different transmission rates in the ordering, there is no transmission rate between the first transmission rate and the second transmission rate.

15. A radio access network (RAN) device comprising:
at least one processor;
data storage; and
program instructions, stored in the data storage, that upon execution by the at least one processor cause the RAN device to perform operations including:

obtaining a pre-established hybrid automatic repeat request (HARQ) transmission schedule of a fixed number of data slots for transmissions from the RAN to a wireless communication device (WCD), wherein the HARQ transmission schedule includes a first set of data slots subject to HARQ acknowledgment bundling and a second set of data slots not subject to HARQ acknowledgment bundling;

based on an indication of RAN transmission signal quality as measured by the WCD, determining a first transmission rate; and based on the HARQ transmission schedule transmitting, to the WCD, two or more HARQ subpackets in the first set of one or more data slots subject to HARQ acknowledgment bundling and one or more HARQ subpackets in the second set of data slots not subject to HARQ acknowledgment bundling, wherein the one or more HARQ subpackets are transmitted at the first transmission rate, and wherein the two or more HARQ subpackets are transmitted at a second transmission rate that is less than the first transmission rate.

16. The RAN device of claim 15, the first set of data slots being subject to HARQ acknowledgment bundling comprises the RAN receiving a single HARQ acknowledgment message from the WCD in response to the WCD receiving HARQ subpackets transmitted in the first set of data slots.

17. The RAN device of claim 16, wherein the single HARQ acknowledgment message is a positive acknowledgment message that indicates that each of the HARQ subpackets transmitted in the first set of data slots was successfully received by the WCD.

* * * * *